US012523948B2

(12) United States Patent
Ueda

(10) Patent No.: US 12,523,948 B2
(45) Date of Patent: Jan. 13, 2026

(54) IMAGE FORMING APPARATUS

(71) Applicant: SHARP KABUSHIKI KAISHA, Sakai (JP)

(72) Inventor: Nobuyuki Ueda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/771,719

(22) Filed: Jul. 12, 2024

(65) Prior Publication Data

US 2025/0028266 A1 Jan. 23, 2025

(30) Foreign Application Priority Data

Jul. 20, 2023 (JP) ................................ 2023-118153

(51) Int. Cl.
*G03G 15/20* (2006.01)
*G03G 15/00* (2006.01)

(52) U.S. Cl.
CPC ....... *G03G 15/2017* (2013.01); *G03G 15/502* (2013.01); *G03G 15/5091* (2013.01)

(58) Field of Classification Search
CPC ............ G03G 15/2017; G03G 15/205; G03G 15/502; G03G 15/5091
See application file for complete search history.

(56) References Cited

U.S. PATENT DOCUMENTS

| | | | | |
|---|---|---|---|---|
| 11,385,576 B2 * | 7/2022 | Saeki | G03G 21/1685 | |
| 2009/0103937 A1 * | 4/2009 | Kudo | G03G 15/502 | 399/80 |
| 2013/0142526 A1 * | 6/2013 | Numazu | G03G 21/1685 | 399/21 |
| 2016/0026129 A1 * | 1/2016 | Tanaka | G03G 15/5066 | 399/122 |
| 2020/0050141 A1 * | 2/2020 | Murota | G03G 15/70 | |
| 2021/0303239 A1 * | 9/2021 | Oka | G03G 15/553 | |
| 2024/0280932 A1 * | 8/2024 | Nakagawa | G03G 15/205 | |

FOREIGN PATENT DOCUMENTS

JP 2000-216577 A 8/2000

OTHER PUBLICATIONS

Machine Translation of JP 2000-216577. (Year: 2000).*

* cited by examiner

*Primary Examiner* — Carla J Therrien
(74) *Attorney, Agent, or Firm* — ScienBiziP, P.C.

(57) ABSTRACT

An image forming apparatus includes: a detachable fuser; and a cooling controller that starts a cooling mode for cooling the fuser, and stops the cooling mode when a cooling completion condition selected by a user is satisfied.

9 Claims, 17 Drawing Sheets

FIG .3

214

| SETTING MODE | TIME |
| --- | --- |
| MODE A1 | 75 MINUTES |
| MODE A2 | 60 MINUTES |
| MODE A3 | 45 MINUTES |

FIG .4

215

| SETTING MODE | COMPLETION NOTIFICATION MESSAGE |
| --- | --- |
| MODE A1 | MESSAGE X1 |
| MODE A2 | MESSAGE X2 |
| MODE A3 | MESSAGE X3 |

FIG .11

1002

| SETTING MODE | TEMPERATURE |
|---|---|
| MODE B1 | 26°C |
| MODE B2 | 45°C |
| MODE B3 | 60°C |

FIG .15

1401

| USER | CHANGE AUTHORITY |
|---|---|
| User_A | ADMINISTRATOR |
| User_B | SKILLED WORKER |
| User_C | ORDINARY PERSON |
| User_D | ORDINARY PERSON |
| User_E | ORDINARY PERSON |

FIG .16

1402

| CHANGE AUTHORITY | SETTABLE SETTING MODE |
|---|---|
| ADMINISTRATOR | MODE A1, A2, A3 |
| SKILLED WORKER | MODE A1, A2 |
| ORDINARY PERSON | MODE A1 |

FIG .19

1801

| CHANGE AUTHORITY | SETTABLE SETTING MODE |
| --- | --- |
| ADMINISTRATOR | MODE B1, B2, B3 |
| SKILLED WORKER | MODE B1, B2 |
| ORDINARY PERSON | MODE B1 |

IMAGE FORMING APPARATUS

CROSS-REFERENCE TO RELATED APPLICATION

The present application claims priority from Japanese Application No. 2023-118153, filed on Jul. 20, 2023, the contents of which are hereby incorporated by reference into this application.

BACKGROUND

1. Field

The present disclosure relates to an image forming apparatus.

2. Description of the Related Art

As a related art, an image forming apparatus that can form an image by replacing a fuser for thermally fixing a toner image on a recording material with another fuser, and notifies an operator of information corresponding to whether the temperature of the mounted fuser has dropped to a predetermined temperature or lower is known.

SUMMARY

In the image forming apparatus known as the related art, whether the temperature of the mounted fuser has dropped to the predetermined temperature or lower is determined. However, when a worker performs replacement work of the fuser, the temperature at which the worker can safely perform the replacement work of the fuser may vary depending on the skill of the worker. In view of the above, an object of an aspect of the present disclosure is to provide an image forming apparatus that can allow a user to select a cooling completion condition of a fuser.

An image forming apparatus according to one mode of the present disclosure includes: a detachable fuser; and a cooling controller that starts a cooling mode for cooling the fuser, and stops the cooling mode when a cooling completion condition selected by a user is satisfied.

BRIEF DESCRIPTION OF THE DRAWINGS

FIG. 3 is a diagram illustrating an example of condition management information according to the first embodiment.

FIG. 4 is a diagram illustrating an example of notification management information.

FIG. 11 is a diagram illustrating an example of condition management information according to the second embodiment.

FIG. 15 is a diagram illustrating an example of a user table.

FIG. 16 is a diagram illustrating an example of a setting mode table according to the modified example of the third embodiment.

FIG. 19 is a diagram illustrating an example of a setting mode table according to the modified example of the fourth embodiment.

DETAILED DESCRIPTION OF THE DISCLOSURE

First Embodiment

Figure 1:
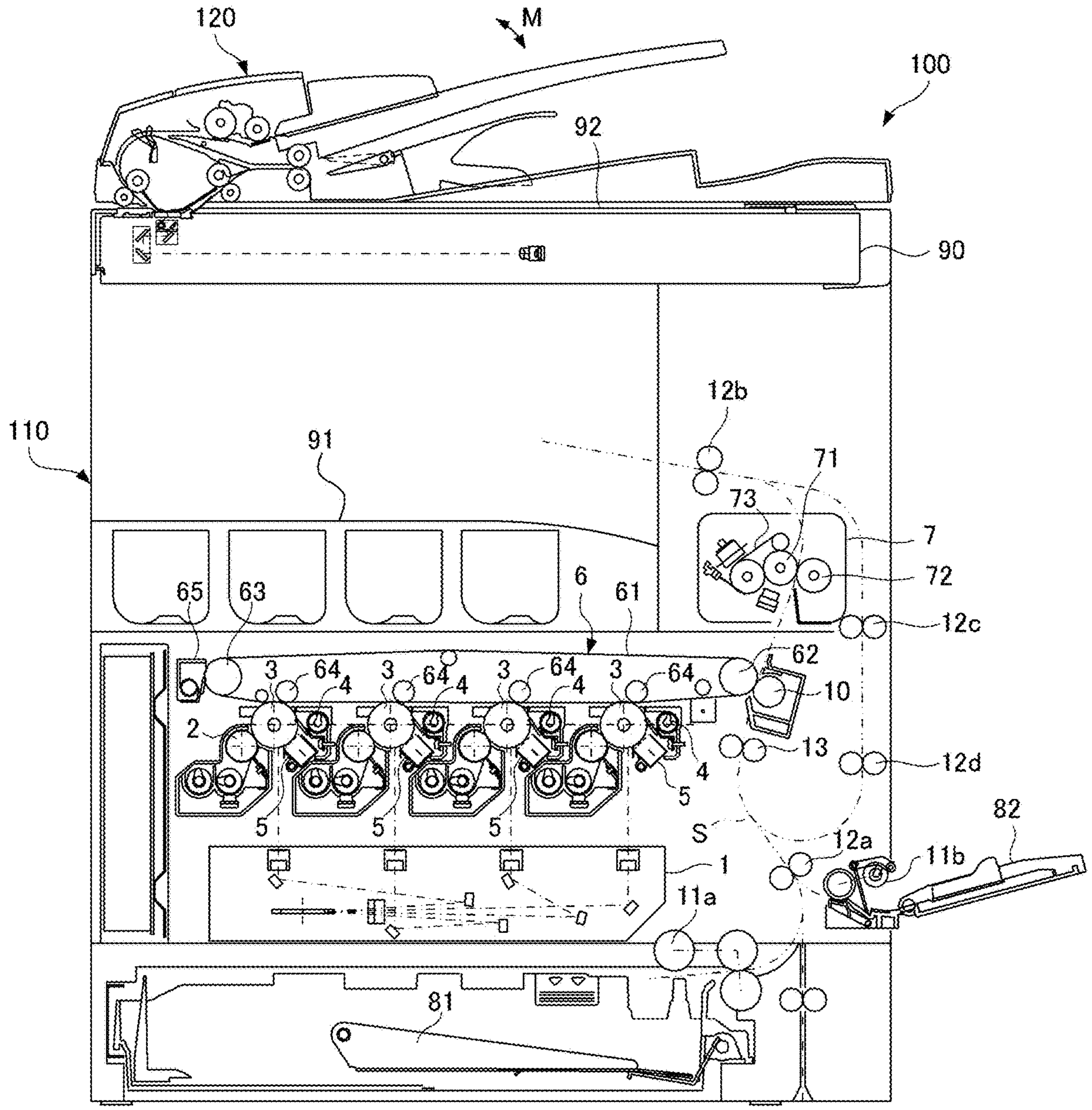
FIG. 1 is a diagram illustrating an example of a structure of an image forming apparatus.

A first embodiment will be described with reference to FIGS. 1 to 9. In the drawings, the same or similar elements are denoted by the same reference numerals, and the redundant description will be omitted.

FIG. 1 is a diagram illustrating an example of a structure of an image forming apparatus 100.

The image forming apparatus 100 forms a multicolor or monochrome image on a predetermined sheet (recording paper sheet) in accordance with image data transmitted from the outside, and includes an apparatus main body 110 and an automatic document processing apparatus 120. The apparatus main body 110 includes an exposure unit 1, developers 2, photoreceptor drums 3, cleaner units 4, chargers 5, an intermediate transfer belt unit 6, a fuser 7, a paper feeding cassette 81, and a paper discharge tray 91.

A document placement table 92 made of transparent glass on which a document is placed is provided on the upper part of the apparatus main body 110, and the automatic document processing apparatus 120 is attached to the upper side of the document placement table 92. The automatic document processing apparatus 120 automatically conveys a document onto the document placement table 92. Moreover, the automatic document processing apparatus 120 can pivotally move in a direction of the arrow M, so that a document can be manually placed by opening the top of the document placement table 92.

Image data to be handled in the image forming apparatus 100 corresponds to a color image using respective colors of black (K), cyan (C), magenta (M), and yellow (Y). Therefore, four developers 2, four photoreceptor drums 3, four chargers 5, and four cleaner units 4 are provided so as to form four types of latent images corresponding to the respective colors, and are set for black, cyan, magenta, and yellow, respectively, thereby constituting four image stations.

The charger 5 is a charger for uniformly charging the surface of the photoreceptor drum 3 to a predetermined potential, and in addition to the charger type as illustrated in FIG. 1, a contact roller type or brush type charger may be used.

The exposure unit 1 is configured as a laser scanning unit (LSU) including a laser emitter, a reflecting mirror, and the like. In the exposure unit 1, a polygon mirror for performing scanning with a laser beam and an optical element, such as a lens and a mirror, for guiding laser light reflected by the polygon mirror to the photoreceptor drum 3 are arranged. The configuration of an optical scanning device configuring the exposure unit 1 will be described in detail below. In addition, as the exposure unit 1, a method using, for example, an EL or LED writing head in which light emitting elements are arranged in an array can also be adopted.

The exposure unit 1 exposes the charged photoreceptor drum 3 in accordance with input image data, and has a function of forming an electrostatic latent image corresponding to the image data on the surface of the photoreceptor drum 3. The developer 2 visualizes the electrostatic latent image formed on each of the photoreceptor drums 3 with toner of four colors (KCMY). The cleaner unit 4 removes and collects the toner remaining on the surface of the photoreceptor drum 3 after the development and the image transfer.

The intermediate transfer belt unit 6 arranged above the photoreceptor drums 3 includes an intermediate transfer belt 61, an intermediate transfer belt driving roller 62, an intermediate transfer belt driven roller 63, intermediate transfer rollers 64, and an intermediate transfer belt cleaning unit 65. Four intermediate transfer rollers 64 are provided corresponding to the respective colors of YMCK.

The intermediate transfer belt driving roller 62, the intermediate transfer belt driven roller 63, and the intermediate transfer rollers 64 stretch and rotationally drive the intermediate transfer belt 61. Moreover, each of the intermediate transfer rollers 64 applies a transfer bias for transferring a toner image of the photoreceptor drum 3 onto the intermediate transfer belt 61.

The intermediate transfer belt 61 is provided so as to be in contact with the respective photoreceptor drums 3, and has a function of forming a color toner image (multicolor toner image) on the intermediate transfer belt 61 by sequentially transferring the toner images of the respective colors formed on the photoreceptor drums 3 onto the intermediate transfer belt 61 in a superimposed manner. The intermediate transfer belt 61 is formed to have an endless shape using, for example, a film having a thickness of about 100 μm to 150 μm.

The transfer of the toner images from the photoreceptor drums 3 onto the intermediate transfer belt 61 is performed by the intermediate transfer rollers 64 which are in contact with the rear side of the intermediate transfer belt 61. The intermediate transfer roller 64 is a roller whose base is a metallic (for example, stainless steel) shaft with a diameter of 8 to 10 mm and whose surface is covered with a conductive elastic material (for example, EPDM, urethane foam, or the like). The conductive elastic material allows a high voltage to be uniformly applied to the intermediate transfer belt 61. In the present disclosure, a roller shape is used as a transfer electrode, but a brush or the like can also be used.

As described above, the electrostatic latent images visualized on the respective photoreceptor drums 3 corresponding to respective hues are laminated on the intermediate transfer belt 61. In this way, the toner images are transferred onto a paper sheet by a transfer roller 10 arranged at a contact position between the paper sheet and the intermediate transfer belt 61, which will be described below, by the rotation of the intermediate transfer belt 61.

At this time, the intermediate transfer belt 61 and the transfer roller 10 are brought into pressure contact with each other at a predetermined nip, and a voltage for transferring the toner onto the paper sheet is applied to the transfer roller 10 (a high voltage having a polarity (+) opposite to the charge polarity (−) of the toner). Furthermore, in order for the transfer roller 10 to constantly obtain the nip, one of the transfer roller 10 and the intermediate transfer belt driving roller 62 is made of a hard material (metal or the like), and the other is made of a soft material, for example, an elastic roller (an elastic rubber roller, a foam resin roller, or the like) is used.

Moreover, as described above, the toner attached to the intermediate transfer belt 61 as a result of making contact with the photoreceptor drums 3 or the toner remaining on the intermediate transfer belt 61 due to transfer not being performed onto the paper sheet by the transfer roller 10 is configured to be removed and collected by the intermediate transfer belt cleaning unit 65 since the toner causes mixing of toner colors in a subsequent step. The intermediate transfer belt cleaning unit 65 includes, for example, a cleaning blade as a cleaning member that makes contact with the intermediate transfer belt 61, and the intermediate transfer belt 61 with which the cleaning blade makes contact is supported by the intermediate transfer belt driven roller 63 from the rear side.

The paper feeding cassette 81 is a tray for storing sheets (recording paper sheets) to be used in image formation, and is provided on the lower side of the exposure unit 1 of the apparatus main body 110. Sheets to be used in image formation can also be placed in a manual paper feeding cassette 82. In addition, the paper discharge tray 91 provided on the upper side of the apparatus main body 110 is a tray for accumulating printed sheets face-down.

Moreover, the apparatus main body 110 is provided with a paper sheet conveyance path S, which has a substantially vertical shape, for sending the sheets in the paper feeding cassette 81 and the manual paper feeding cassette 82 to the paper discharge tray 91 via the transfer roller 10 and the fuser 7. Pick-up rollers 11*a* and 11*b*, a plurality of conveyance rollers 12*a* to 12*d*, a registration roller 13, the transfer roller 10, the fuser 7, and the like are arranged in the vicinity of the paper sheet conveyance path S from the paper feeding cassette 81 or the manual paper feeding cassette 82 to the paper discharge tray 91.

The conveyance rollers 12*a* to 12*d* are small rollers for promoting and assisting the conveyance of the sheets, and a plurality of conveyance rollers 12*a* to 12*d* are provided along the paper sheet conveyance path S. The pick-up roller 11*a* is provided in the vicinity of an end portion of the paper feeding cassette 81, picks up the sheets one by one from the paper feeding cassette 81, and supplies the sheets to the paper sheet conveyance path S. Similarly, the pick-up roller 11*b* is provided in the vicinity of an end portion of the manual paper feeding cassette 82, picks up the sheets one by one from the manual paper feeding cassette 82, and supplies the sheets to the paper sheet conveyance path S.

The registration roller 13 temporarily holds a sheet being conveyed through the paper sheet conveyance path S. The registration roller 13 has a function of conveying the sheet to the transfer roller 10 at a timing when a tip end of the toner image on the photoreceptor drum 3 aligns with a tip end of the sheet.

The fuser 7 includes a heat roller 71 and a pressure roller 72, and is detachable. The fuser 7 is locked in the apparatus main body 110 by a lock mechanism (not illustrated) for locking the fuser 7 in the apparatus main body 110. The heat roller 71 and the pressure roller 72 rotate with a sheet interposed therebetween. The heat roller 71 is set to a predetermined fixing temperature by a controller on the basis of a signal from a temperature detector (not illustrated), and has a function of fusing, mixing, and pressing the multicolor toner image transferred onto the sheet to thermally fix the multicolor toner image to the sheet by thermally pressing the toner to the sheet together with the pressure roller 72. An external heating belt 73 for heating the heat roller 71 from the outside is provided.

Next, a sheet conveyance route will be described in detail. As described above, the paper feeding cassette 81 and the manual paper feeding cassette 82 that store sheets in advance are provided in the image forming apparatus. In order to feed sheets from the paper feeding cassettes 81 and 82, the pick-up rollers 11*a* and 11*b* are respectively arranged to guide the sheets one by one to the conveyance path S.

The sheet conveyed from each of the paper feeding cassettes 81 and 82 is conveyed to the registration roller 13 by the conveyance roller 12*a* of the paper sheet conveyance path S, and is conveyed to the transfer roller 10 at a timing when a tip end of the sheet and a tip end of image information on the intermediate transfer belt 61 are aligned, and the image information is written on the sheet. Then, unfixed toner on the sheet is fused by heat and fixed when the sheet passes through the fuser 7, and the sheet is discharged onto the paper discharge tray 91 via the conveyance roller 12*b* arranged thereafter.

The above-described sheet conveyance route is a route in the case of a single-sided printing request for the sheet. On the other hand, in the case of a double-sided printing request, when the rear end of the sheet which has passed through the fuser 7 after the completion of the single-sided printing as described above is held by the final conveyance roller 12*b*, the conveyance roller 12*b* is reversely rotated to guide the sheet to the conveyance rollers 12*c* and 12*d*. Thereafter, the sheet passes through the registration roller 13, printing is performed on the back surface of the sheet, and then the sheet is discharged to the paper discharge tray 91.

Figure 2:
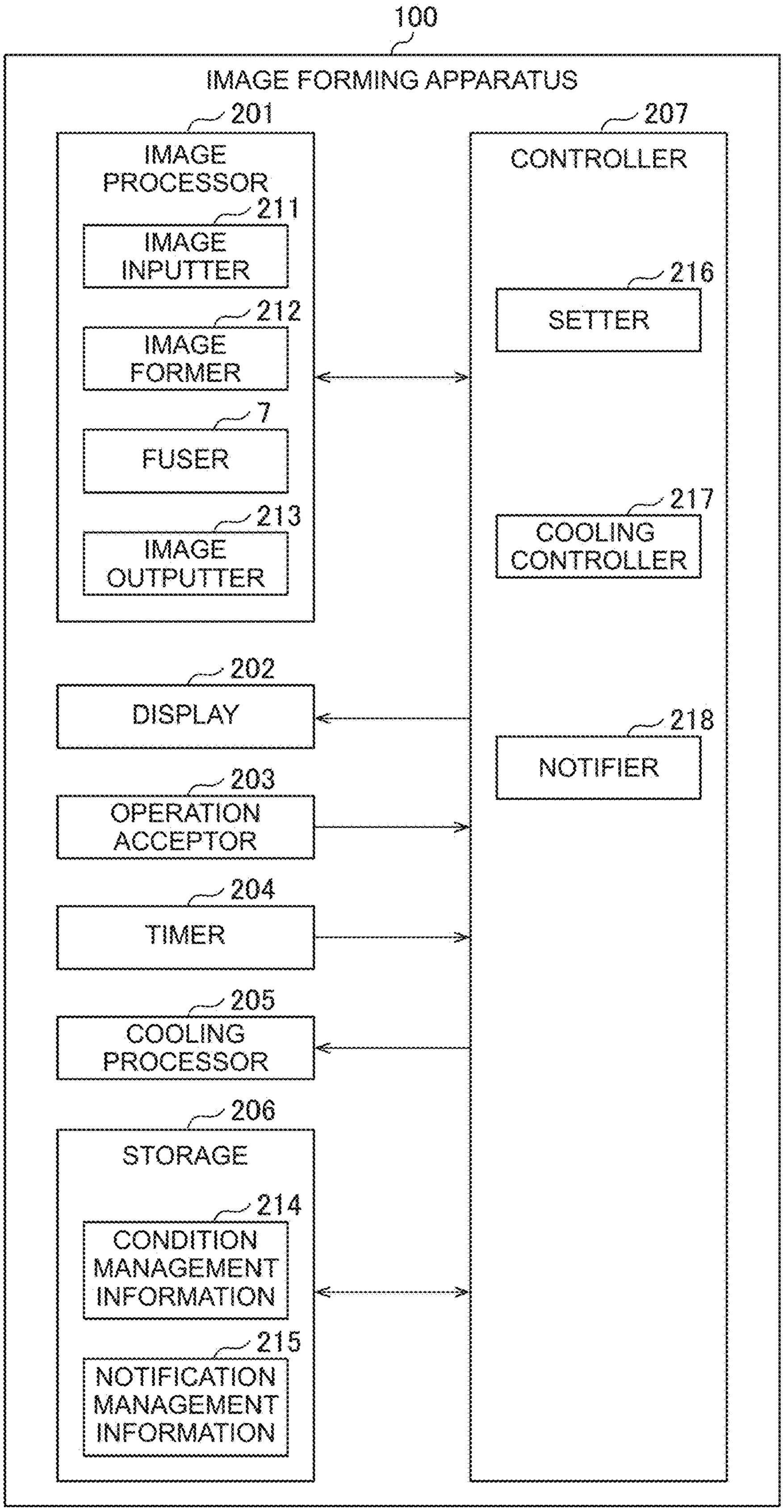
FIG. 2 is a block diagram illustrating an example of a functional configuration of the image forming apparatus according to a first embodiment.

FIG. 2 is a block diagram illustrating an example of a functional configuration of the image forming apparatus 100. The image forming apparatus 100 includes an image processor 201, a display 202, an operation acceptor 203, a timer 204, a cooling processor 205, a storage 206, and a controller 207.

The image processor 201 executes an image forming function. The image processor 201 includes an image inputter 211, an image former 212, the fuser 7, and an image outputter 213.

The image inputter 211 inputs image data. The image inputter 211 is achieved by the document placement table 92, the automatic document processing apparatus 120, and the like illustrated in FIG. 1.

The image former 212 forms a printable electrostatic latent image from the input image data. The image former 212 is achieved by the developers 2, the photoreceptor drums 3, the chargers 5, the cleaner units 4, the exposure unit 1, the intermediate transfer belt 61, and the like illustrated in FIG. 1.

The image outputter 213 outputs a sheet on which the electrostatic latent image is formed.

The display 202 displays information to be presented to a user. For example, the display 202 is configured by a liquid crystal panel, an organic electro-luminescence (EL) panel, or the like.

The operation acceptor 203 accepts an operation of the user. For example, the operation acceptor 203 is configured by a touch panel or the like.

The timer 204 measures time in response to an instruction from the controller 207.

The cooling processor 205 cools the fuser 7. For example, the cooling processor 205 is configured by including a cooling fan (not illustrated). In this case, the cooling processor 205 rotates the cooling fan to send air to the fuser 7, and cools the fuser 7.

The storage 206 is a recording medium capable of recording various types of data, programs, and the like. Specifically, the storage 206 stores condition management information 214 (refer to FIG. 3) and notification management information 215 (refer to FIG. 4). For example, the storage 206 is configured by a hard disk drive (HDD), a solid-state drive (SSD), a semiconductor memory, or the like. In the condition management information 214, a time is registered in association with a setting mode. In the notification management information 215, a completion notification message is registered in association with the setting mode.

The controller 207 executes various types of processing in accordance with the programs and data stored in the storage 206. For example, the controller 207 is configured by a processor such as a central processing unit (CPU). The controller 207 includes a setter 216, a cooling controller 217, and a notifier 218.

The setter 216 sets a cooling completion condition selected by the user. In the image forming apparatus 100 according to the present embodiment, the cooling completion condition indicates a predetermined time from the start of cooling to the stop of cooling of the fuser 7. Specifically, the setter 216 sets a setting mode selected by the user among a plurality of setting modes registered in the condition management information 214. Then, the setter 216 sets a cooling completion condition indicating a predetermined time in association with the set setting mode.

The cooling controller 217 starts a cooling mode for cooling the fuser 7, and stops the cooling mode when the set cooling completion condition is satisfied. That is, the cooling controller 217 starts the cooling mode, and stops the cooling mode when the cooling completion condition selected by the user is satisfied. Specifically, the cooling controller 217 stops the cooling mode after a predetermined time indicated by the cooling completion condition selected by the user has elapsed after the start of the cooling mode. Furthermore, the cooling controller 217 does not allow the fuser 7 to be detachable until the cooling mode is stopped after the start of the cooling mode, and allows the fuser 7 to be detachable after the cooling mode is stopped.

When the cooling controller 217 stops the cooling mode, the notifier 218 outputs a cooling completion notification indicating a message corresponding to the predetermined time indicated by the set cooling completion condition. Specifically, the notifier 218 outputs the cooling completion notification indicating a completion notification message in association with the set setting mode in the notification management information 215. For example, the notifier 218 outputs the cooling completion notification by characters, voice, or the like.

FIG. 3 is a diagram illustrating an example of the condition management information 214. For example, in the condition management information 214 illustrated in FIG. 3, the setting modes that are Mode A1, Mode A2, and Mode A3 are associated with predetermined times that are 75 minutes, 60 minutes, and 45 minutes, respectively. For example, when the setting mode that is Mode A1 is selected by the operation of the user, the setter 216 sets the cooling completion condition indicating the predetermined time that is 75 minutes.

FIG. 4 is a diagram illustrating an example of the notification management information 215. For example, in the notification management information 215 illustrated in FIG. 4, the setting modes that are Mode A1, Mode A2, and Mode A3 are associated with completion notification messages that are Message X1, Message X2, and Message X3, respectively. For example, when the setting mode that is Mode A1 is set, in the case where the cooling controller 217 stops the cooling mode, the notifier 218 outputs the cooling completion notification indicating the completion notification message that is Message X1.

Figure 5:
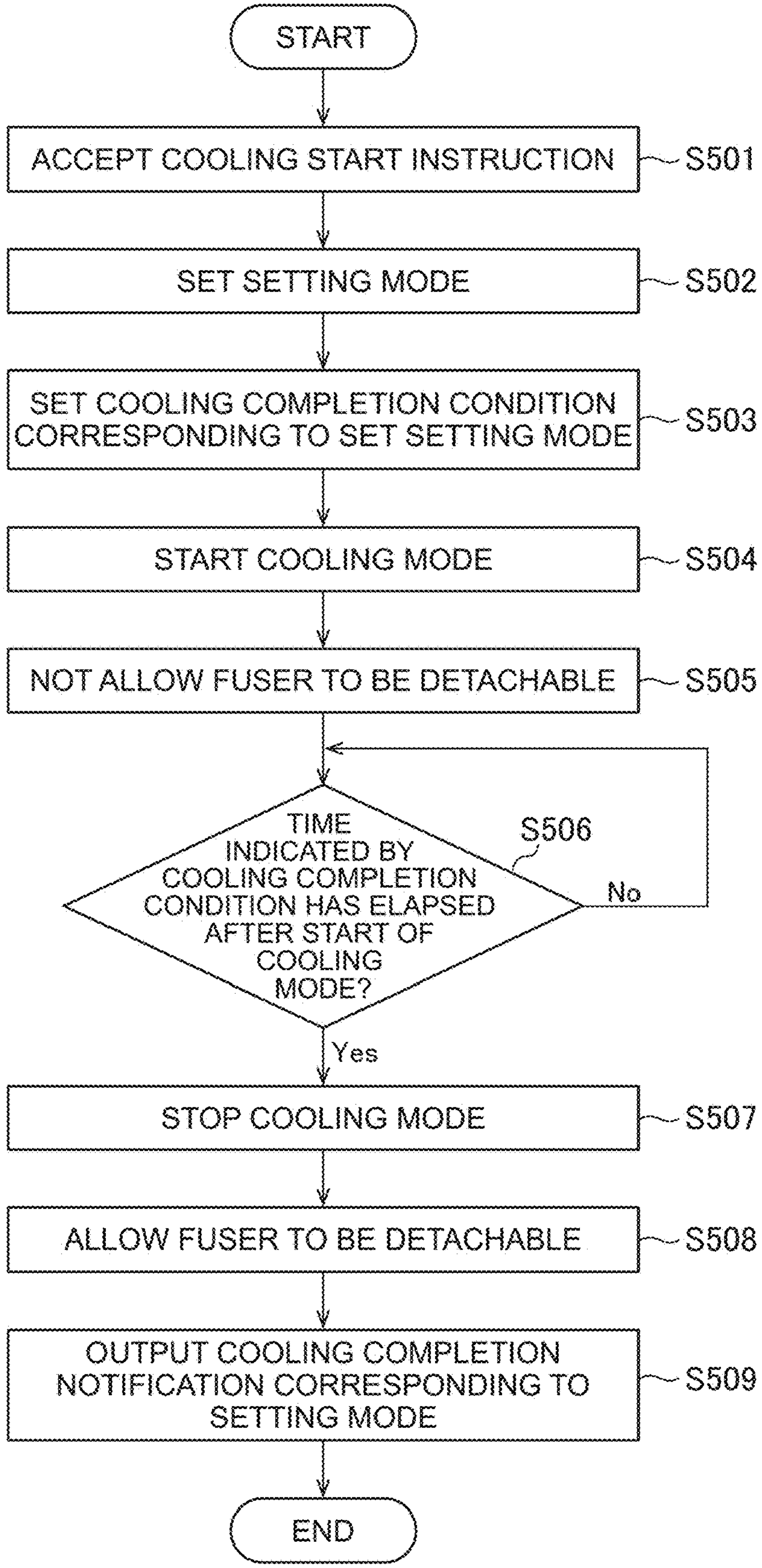
FIG. 5 is a flowchart illustrating an example of an action of the image forming apparatus according to the first embodiment.

FIG. 5 is a flowchart illustrating an example of an action of the image forming apparatus 100 according to the present embodiment.

In step S501, the controller 207 accepts a cooling start instruction. For example, the controller 207 causes the display 202 to display a replacement start screen 601 (refer to FIG. 6A) for accepting a replacement start operation. When the operation acceptor 203 accepts the replacement start operation on the replacement start screen 601, the controller 207 causes the display 202 to display a cooling start screen 603 (refer to FIG. 6B) for accepting a cooling start instruction operation. When the operation acceptor 203 accepts the cooling start instruction operation on the cooling start screen 603, the controller 207 determines that the cooling start instruction has been accepted.

Figure 6A:
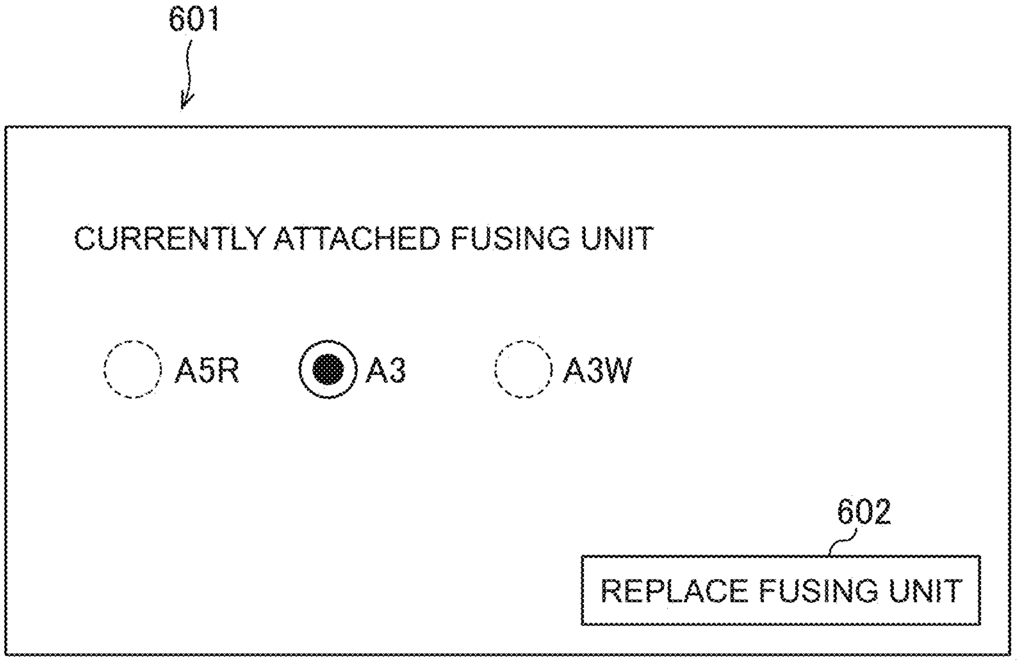
FIG. 6A is a diagram illustrating an example of a replacement start screen.

FIG. 6A is a diagram illustrating an example of the replacement start screen 601.

The replacement start screen 601 shows the type of the fuser 7 that can be attached to the image forming apparatus 100 and the type of the fuser 7 attached to the image forming apparatus 100. For example, the replacement start screen 601 indicates that an A5R type, an A3 type, and an A3W type can be attached to the image forming apparatus 100, and the A3 type fuser 7 is attached.

When the operation acceptor 203 accepts an operation of selecting a button 602, the controller 207 determines that the replacement start operation has been accepted. The controller 207 causes the display 202 to display the cooling start screen 603.

Figure 6B:
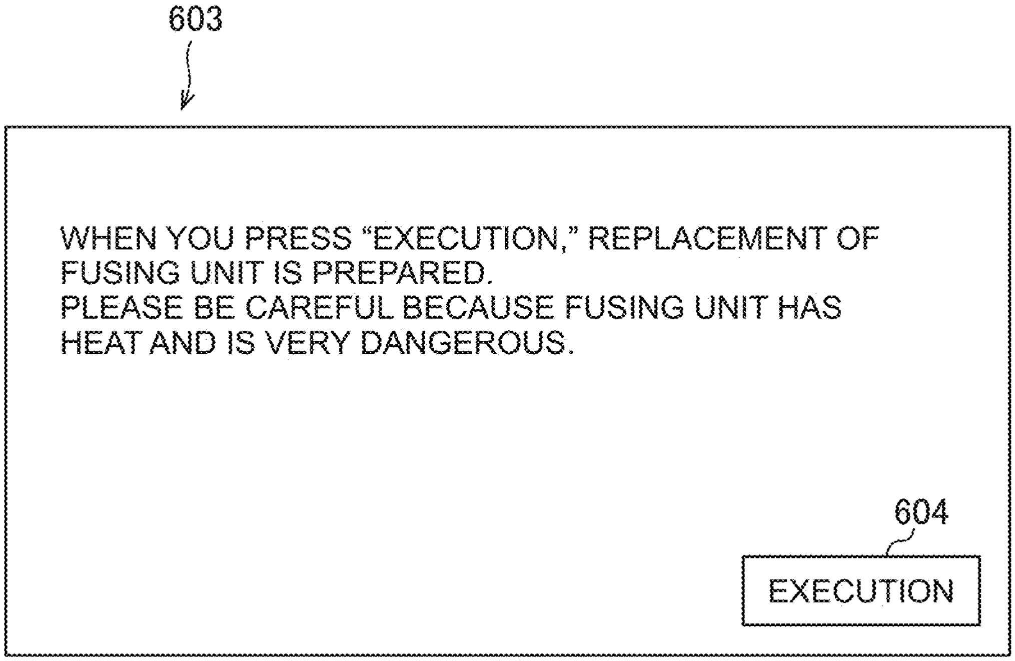
FIG. 6B is a diagram illustrating an example of a cooling start screen.

FIG. 6B is a diagram illustrating an example of the cooling start screen 603.

Figure 6C:
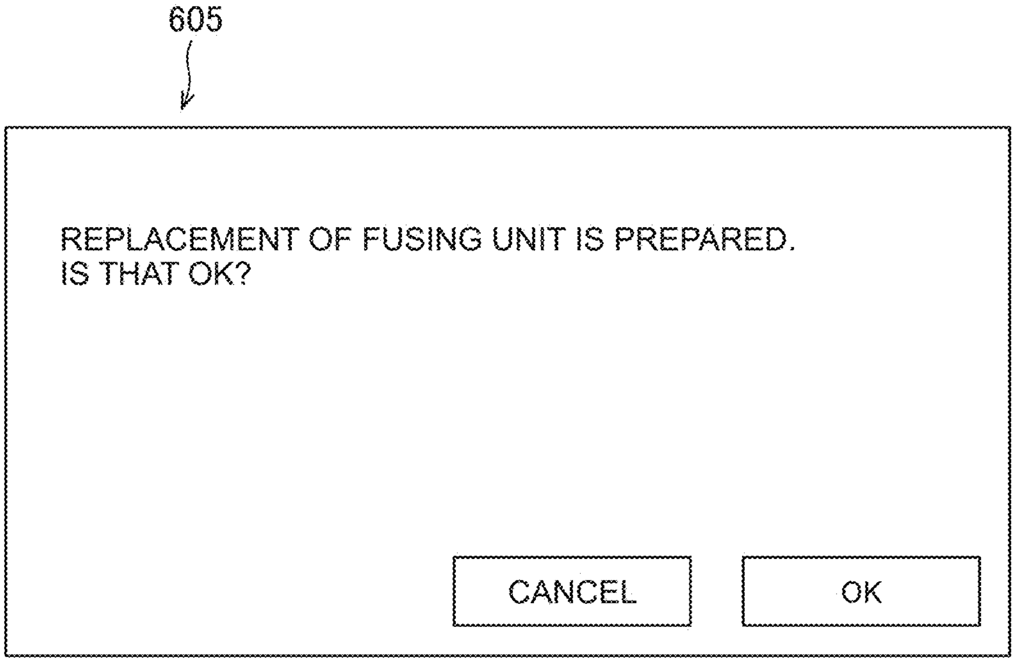
FIG. 6C is a diagram illustrating an example of a confirmation screen.

The cooling start screen 603 shows a message notifying the user that the replacement of the fuser 7 is prepared. For example, the cooling start screen 603 shows a message "Replacement of fusing unit is prepared." Furthermore, the cooling start screen 603 shows a message for calling the user's attention so that the user does not touch the fuser 7. For example, the cooling start screen 603 shows a message "Please be careful because fusing unit has heat and is very dangerous." When the operation acceptor 203 accepts an operation of selecting a button 604 indicating the cooling start instruction operation, the controller 207 determines that the cooling start instruction has been accepted. In order to prevent the controller 207 from determining that the cooling start instruction has been accepted due to erroneous selection of the button 604 by the user, the controller 207 may cause the display 202 to display a confirmation screen 605 as illustrated in FIG. 6C.

In subsequent step S502, the setter 216 sets a setting mode. For example, the operation acceptor 203 accepts an operation of selecting a setting mode, the setter 216 sets the selected setting mode.

In step S503, the setter 216 sets a cooling completion condition corresponding to the set setting mode. Specifically, the setter 216 sets a cooling completion condition indicating a time in association with the set setting mode in the condition management information 214. Accordingly, the image forming apparatus 100 according to the present embodiment can execute the cooling mode for a time desired by the user in accordance with the skill of the user, a work schedule, or the like.

In step S504, the cooling controller 217 starts the cooling mode. For example, when starting the cooling mode, the cooling controller 217 rotates the cooling fan configuring the cooling processor 205. Furthermore, when starting the cooling mode, the cooling controller 217 activates the timer 204 to cause the timer 204 to measure an elapsed time from the start of the cooling mode. The cooling controller 217 may cause the display 202 to display a standby screen 701 (refer to FIG. 7) during the execution of the cooling mode.

In step S505, the cooling controller 217 does not allow the fuser 7 to be detachable. Specifically, when executing the cooling mode, the cooling controller 217 activates the lock mechanism (not illustrated) so as to lock the fuser 7 and the apparatus main body 110, so that the fuser 7 is not allowed to be detachable.

Figure 7:
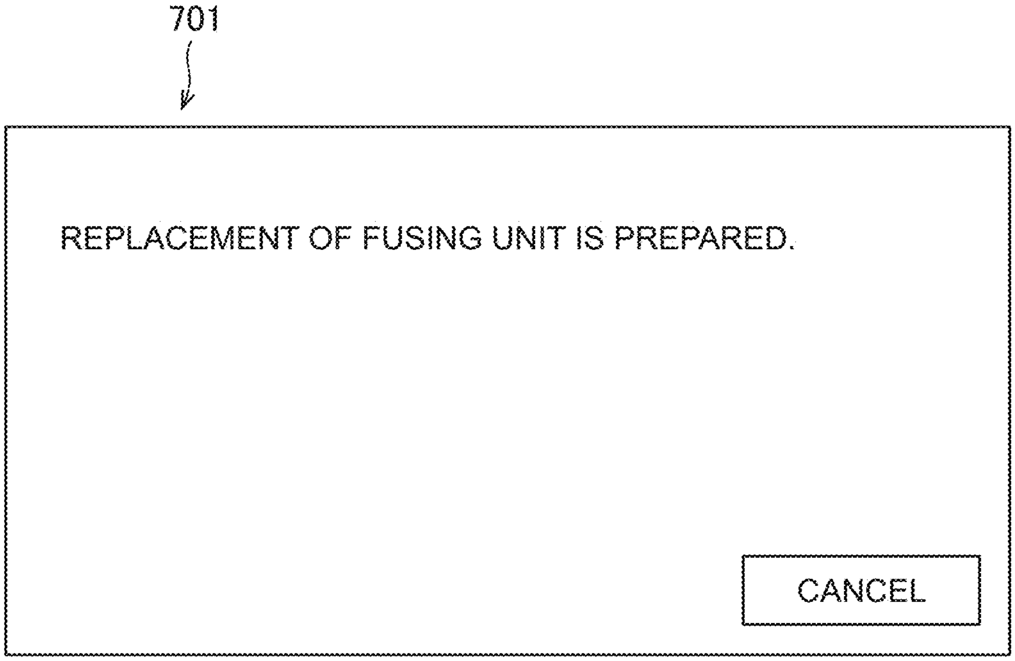
FIG. 7 is a diagram illustrating an example of a standby screen.

FIG. 7 is a diagram illustrating an example of the standby screen 701. The standby screen 701 shows a message "Replacement of fusing unit is prepared." The controller 207 causes the display 202 to display the standby screen 701, so that the user can be prompted to wait until the cooling mode is stopped. Accordingly, the image forming apparatus 100 can prevent the user from touching the fuser 7 while the cooling mode is executed.

In subsequent step S506, the cooling controller 217 determines whether a predetermined time indicated by the cooling completion condition set in step S503 has elapsed after the start of the cooling mode. When the predetermined time indicated by the cooling completion condition has not elapsed in step S506, the controller 207 returns the processing to step S506.

On the other hand, when the predetermined time indicated by the cooling completion condition has elapsed in step S506, the cooling controller 217 stops the cooling mode in step S507. When stopping the cooling mode, the cooling controller 217 stops the rotation of the cooling fan configuring the cooling processor 205.

In step S508, the cooling controller 217 allows the fuser 7 to be detachable. Specifically, the cooling controller 217 activates the lock mechanism (not illustrated) so as to release the fuser 7 and the apparatus main body 110 from being locked, so that the fuser 7 is allowed to be detachable.

For example, it is assumed that the condition management information 214 illustrated in FIG. 3 is stored in the storage 206. Then, it is assumed that the setting mode that is Mode A1 is selected by the operation of the user. In this case, the setter 216 sets the cooling completion condition indicating the predetermined time that is 75 minutes. In this case, the fuser 7 is not allowed to be detachable until 75 minutes have elapsed after the start of the cooling mode. On the other hand, when the setting mode that is Mode A2 is selected by the operation of the user, the setter 216 sets the cooling completion condition indicating the predetermined time that is 60 minutes. In this case, the fuser 7 is not allowed to be detachable until 60 minutes have elapsed after the start of the cooling mode. That is, when the setting mode that is Mode A2 is selected by the operation of the user, the fuser 7 is allowed to be detachable earlier than when the setting mode that is Mode A1 is selected.

For example, in the case where the user is a skilled worker, the user grasps a portion having a relatively high temperature when performing work of replacing the fuser 7. Thus, in the case where the user is a skilled worker, the user can safely perform the work even in a state where the fuser 7 is not sufficiently cooled by performing the work while wearing gloves or the like. On the other hand, in the case where the user is not a skilled worker, the user may feel hot when performing the work of replacing the fuser 7. Thus, in the case where the user is not a skilled worker, the user preferably performs the work of replacing the fuser 7 after the fuser 7 is sufficiently cooled.

Therefore, by selecting the setting mode that is Mode A2, the user who is a skilled worker can perform the work of replacing the fuser 7 earlier than when the setting mode that is Mode A1 is selected, even when the fuser 7 is not sufficiently cooled.

Alternatively, when the user performs the work of replacing the fuser 7, the working time may be limited. In this case, the user may desire the work of replacing the fuser 7 even when the fuser 7 is not sufficiently cooled. Even in this case, by selecting the setting mode that is Mode A2, the user can perform the work of replacing the fuser 7 earlier than when the setting mode that is Mode A1 is selected. Accordingly, the user can perform the work of replacing the fuser 7 within the limited working time.

In step S509, the notifier 218 outputs a cooling completion notification corresponding to the setting mode. For example, the notifier 218 causes the display 202 to display a screen showing a completion notification message in association with the set setting mode in the notification management information 215.

Figure 8A:
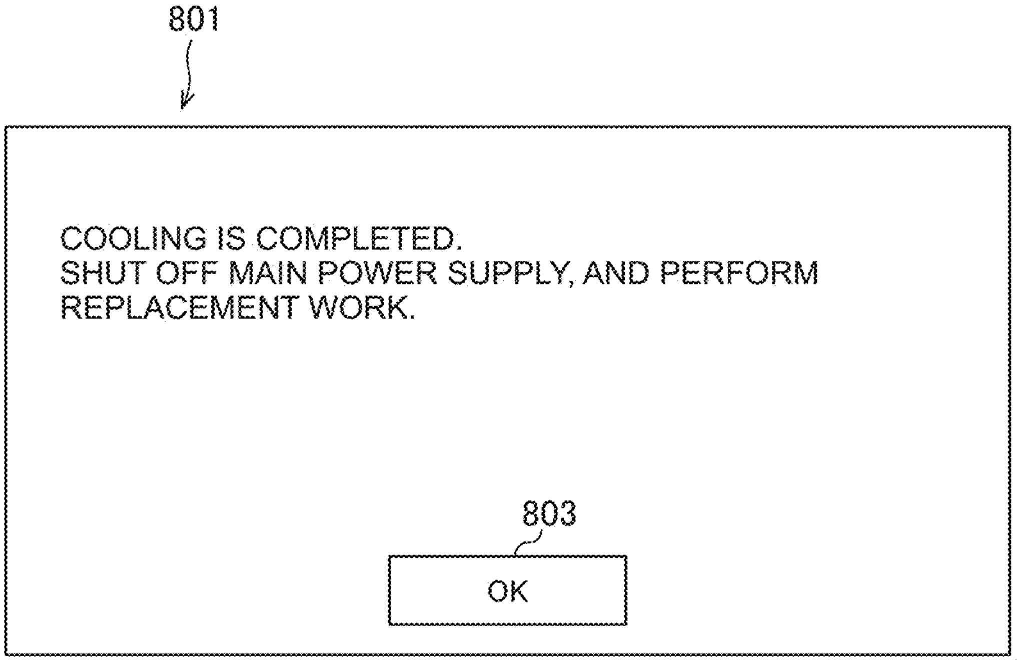
FIG. 8A is a diagram illustrating an example of a completion notification screen 801 showing Message X1 in association with a setting mode that is Mode A1.
Figure 8B:
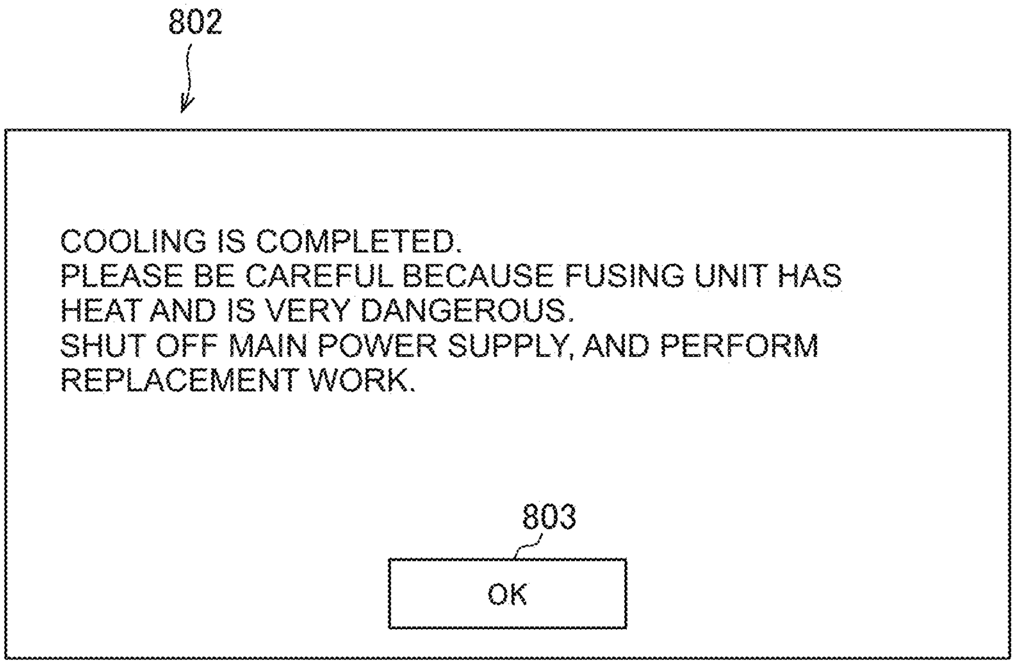
FIG. 8B is a diagram illustrating an example of a completion notification screen 802 showing Message X2 in association with the setting mode that is Mode A2.

FIG. 8A is a diagram illustrating an example of a completion notification screen 801 showing Message X1 in association with the setting mode that is Mode A1. FIG. 8B is a diagram illustrating an example of a completion notification screen 802 showing Message X2 in association with the setting mode that is Mode A2.

For example, Message X1 shown on the completion notification screen 801 is "Cooling is completed. Shut off main power supply, and perform replacement work." On the other hand, Message X2 shown on the completion notification screen 802 is "Cooling is completed. Please be careful because fusing unit has heat and is very dangerous. Shut off main power supply, and perform replacement work."

For example, when the setting mode that is Mode A2 is set, the time for cooling the fuser 7 is shorter than that when the setting mode that is Mode A1 is set. Thus, when the setting mode that is Mode A2 is set, the temperature of the fuser 7 is higher than that when the setting mode that is Mode A1 is set. Therefore, when the setting mode that is Mode A2 is set, the notifier 218 causes the display 202 to display a message for calling the user's attention, so that the notifier 218 can cause the user to recognize that the fuser 7 is not sufficiently cooled.

Furthermore, the completion notification screen 801 and the completion notification screen 802 include a button 803 indicating the start of the replacement. When the operation acceptor 203 accepts an operation of selecting the button 803, the controller 207 causes the display 202 to display a setting screen 901 (refer to FIG. 9) for setting the type of the fuser 7 after the replacement.

Figure 9:
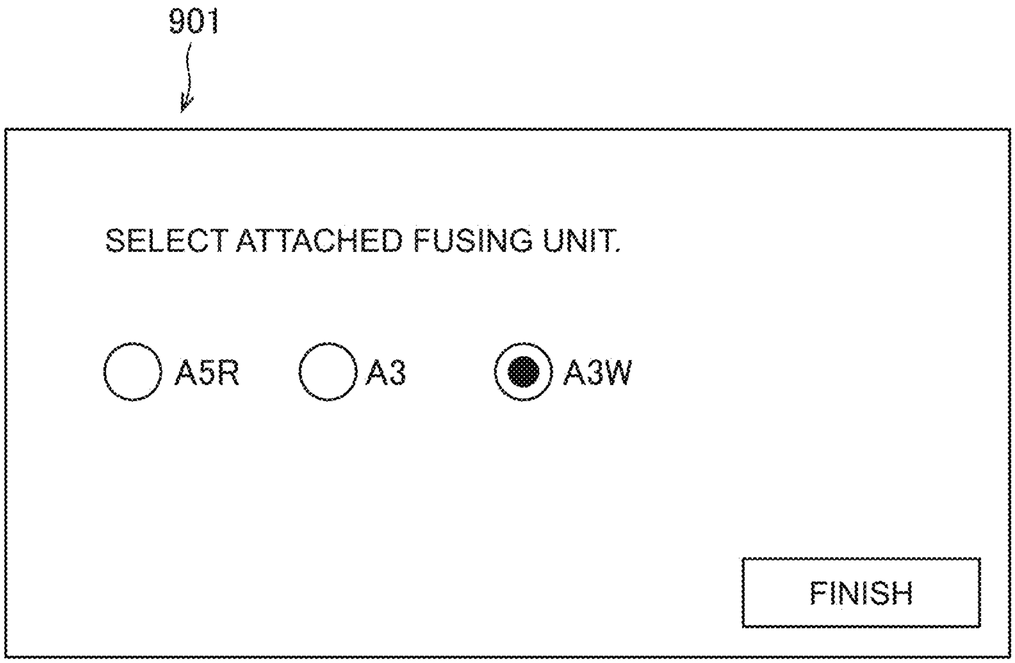
FIG. 9 is a diagram illustrating an example of a setting screen.

FIG. 9 is a diagram illustrating an example of the setting screen 901.

The setting screen 901 shows information indicating the type of the fuser 7 that can be attached to the image forming apparatus 100. For example, the setting screen 901 illustrated in FIG. 9 indicates that the A5R type fuser 7, the A3 type fuser 7, and the A3W type fuser 7 can be attached to the image forming apparatus 100. The user performs an operation of selecting the type of the fuser 7 after the replacement from the types indicated by the information included in the setting screen 901. For example, the setting screen 901 illustrated in FIG. 9 indicates that the A3W type fuser 7 is selected as the type of the fuser 7 after the replacement.

The controller 207 may cause the display 202 to display characters, images, and the like indicating a work procedure for a series of work in which the user removes the fuser 7 attached to the image forming apparatus 100 and attaches a new fuser 7 to the image forming apparatus 100. When the operation acceptor 203 does not accept an operation of selecting a type different from the type of the fuser 7 before the replacement, the operation acceptor 203 may be configured not to accept the operation of selecting the type of the fuser 7 after the replacement.

As described above, the image forming apparatus 100 according to the present embodiment can allow the user to select the cooling completion condition of the fuser 7. Accordingly, the image forming apparatus 100 according to the present embodiment can cool the fuser 7 for a time desired by the user in accordance with the skill of the user, a work schedule, or the like. As a result, the image forming apparatus 100 according to the present embodiment can cause the user to safely perform the work of replacing the fuser 7 after the fuser 7 is cooled for the time desired by the user.

Second Embodiment

A second embodiment will be described with reference to FIGS. 10 to 12. In the drawings, the same or similar elements are denoted by the same reference numerals, and the redundant description will be omitted. Configurations and processing having substantially the same functions as those in other embodiments are denoted by the common reference numerals, the descriptions thereof are omitted, and differences from the other embodiments will be described.

Figure 10:
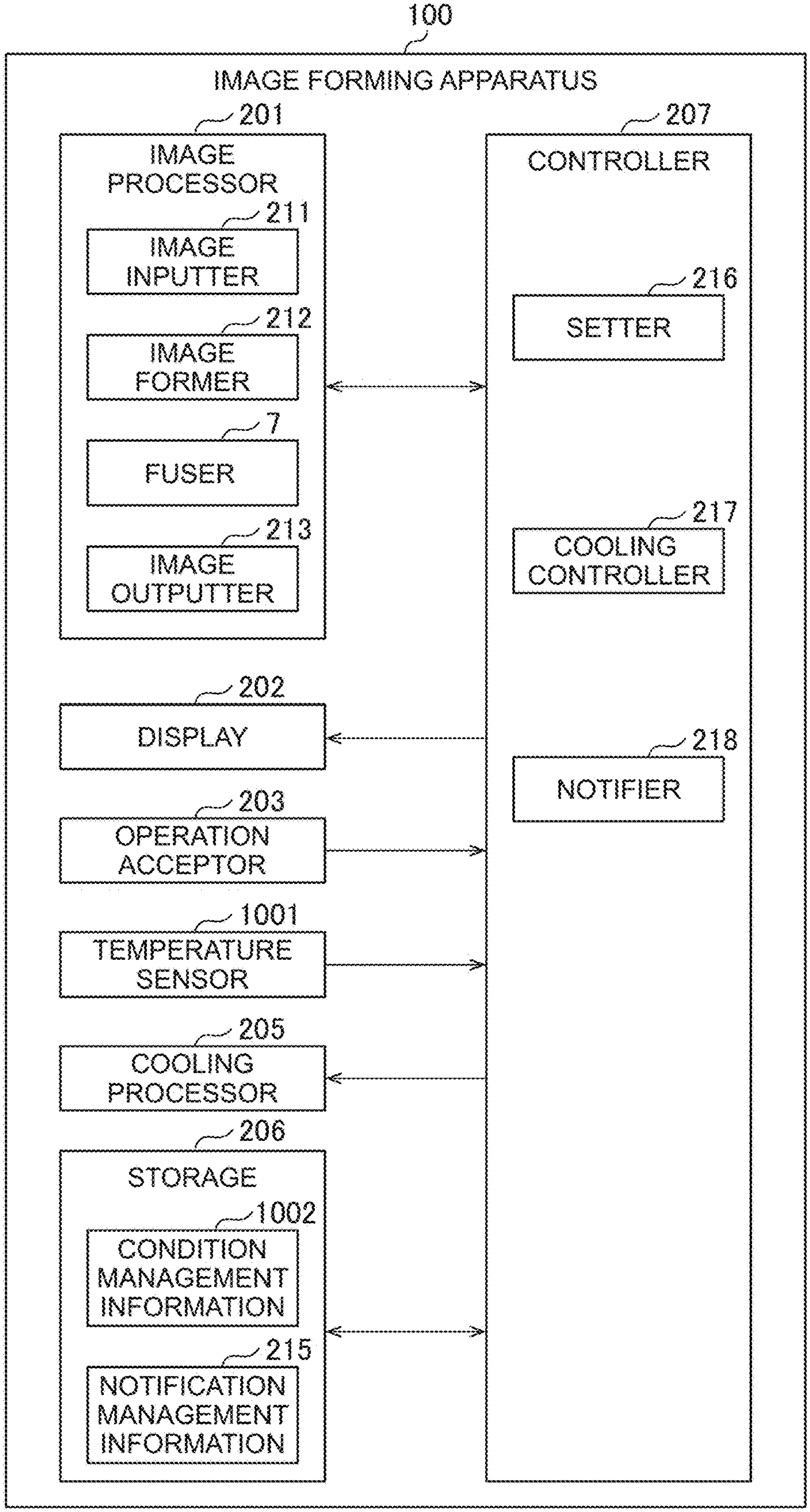
FIG. 10 is a block diagram illustrating an example of a functional configuration of an image forming apparatus according to a second embodiment.

FIG. 10 is a block diagram illustrating an example of the functional configuration of the image forming apparatus 100 according to the present embodiment. The image forming apparatus 100 illustrated in FIG. 10 is different from the image forming apparatus 100 illustrated in FIG. 2 in that the image forming apparatus 100 illustrated in FIG. 10 includes a temperature sensor 1001 instead of the timer 204, and condition management information 1002 is stored in the storage 206 instead of the condition management information 214.

The temperature sensor 1001 measures a temperature of a region along the fuser 7.

In the condition management information 1002, a predetermined temperature is registered in association with a setting mode.

The setter 216 according to the present embodiment sets a cooling completion condition indicating a predetermined temperature in association with the set setting mode. That is, in the image forming apparatus 100 according to the present embodiment, the cooling completion condition indicates a predetermined temperature to be reached after the start of cooling of the fuser 7.

The cooling controller 217 according to the present embodiment stops the cooling mode after the temperature measured by the temperature sensor 1001 has reached a predetermined temperature or lower indicated by the cooling completion condition selected by the user after the start of the cooling mode. That is, the cooling controller 217 stops the cooling mode after the temperature measured by the temperature sensor 1001 has reached a predetermined temperature or lower indicated by the set cooling completion condition after the start of the cooling mode.

When the cooling controller 217 stops the cooling mode, the notifier 218 according to the present embodiment outputs a cooling completion notification indicating a message corresponding to the predetermined temperature indicated by the set cooling completion condition.

FIG. 11 is a diagram illustrating an example of the condition management information 1002. For example, in the condition management information 1002 illustrated in FIG. 11, the setting modes that are Mode B1, Mode B2, and Mode B3 are associated with temperatures that are 26° C., 45° C., and 60° C., respectively. For example, when the setting mode that is Mode B1 is selected by the operation of the user, the setter 216 sets the cooling completion condition indicating 26° C.

Figure 12:
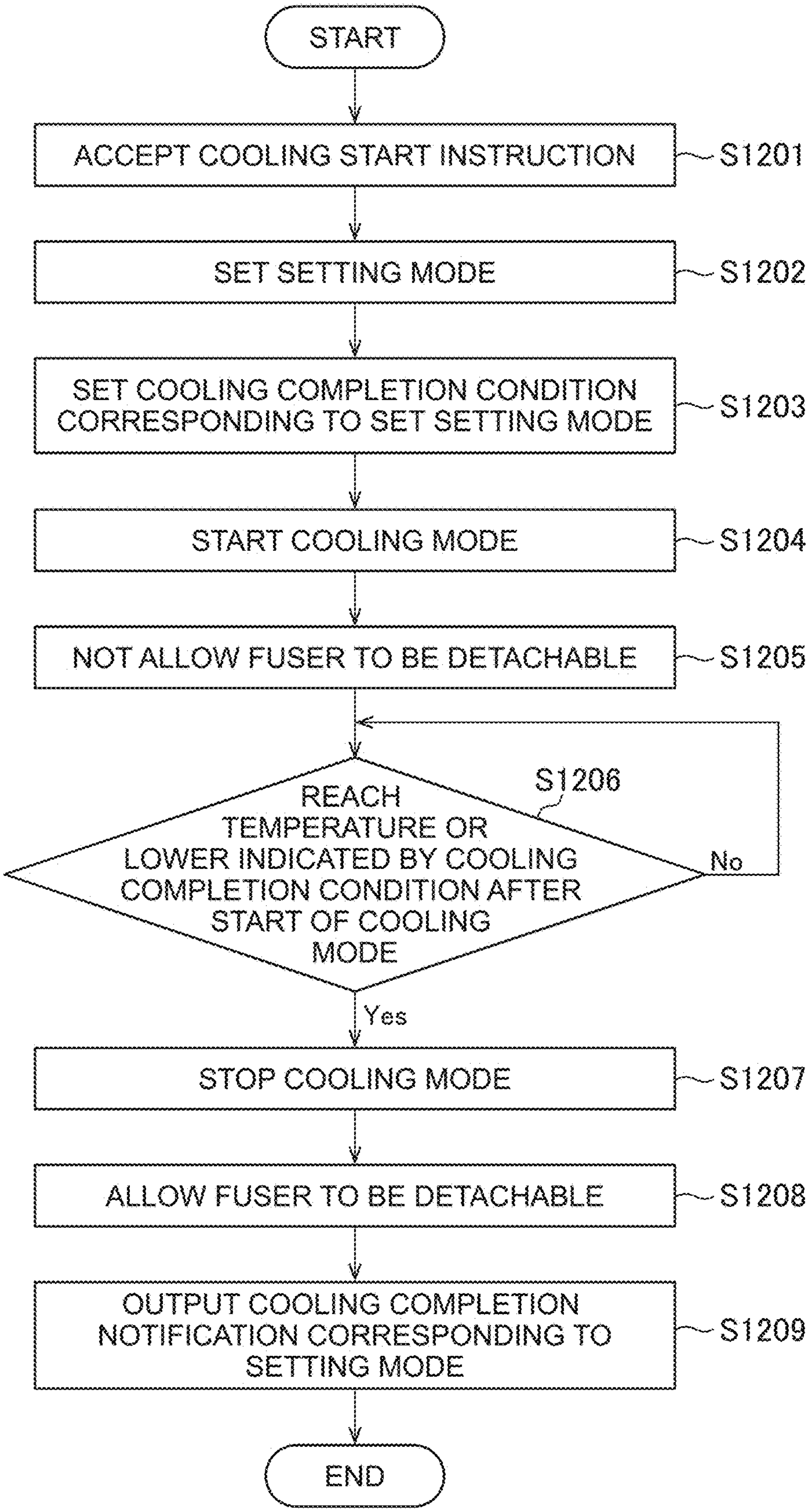
FIG. 12 is a flowchart illustrating an example of an action of the image forming apparatus according to the second embodiment.

FIG. 12 is a flowchart illustrating an example of an action of the image forming apparatus 100 according to the present embodiment. The processing from step S1201 to step S1205 is the same as the processing from step S501 to step S505 illustrated in FIG. 5, and thus the detailed description will be omitted.

In step S1206, the cooling controller 217 determines whether the temperature measured by the temperature sensor 1001 has reached a predetermined temperature or lower indicated by the cooling completion condition set in step S1203 after the start of the cooling mode. That is, the cooling controller 217 determines whether the temperature of the fuser 7 has reached a predetermined temperature or lower indicated by the cooling completion condition after the start of the cooling mode.

When the temperature measured by the temperature sensor 1001 in step S1206 has not reached the predetermined temperature or lower indicated by the cooling completion condition, the controller 207 returns the processing to step S1206. On the other hand, when the temperature measured by the temperature sensor 1001 in step S1206 has reached the predetermined temperature or lower indicated by the cooling completion condition, the controller 207 proceeds the processing to step S1207. The processing of step S1207 and subsequent steps is the same as the processing of step S507 and subsequent steps illustrated in FIG. 5, and thus the detailed description will be omitted.

For example, it is assumed that the condition management information 1002 illustrated in FIG. 11 is stored in the storage 206. Then, it is assumed that the setting mode that is Mode B1 is selected by the user. In this case, the setter 216 sets the cooling completion condition indicating the predetermined temperature that is 26° C. In this case, the fuser 7 is not allowed to be detachable until the temperature measured by the temperature sensor 1001 has decreased to 26° C. or lower after the start of the cooling mode. That is, the fuser 7 is not allowed to be detachable until the temperature of the fuser 7 has decreased to 26° C. or lower after the start of the cooling mode.

On the other hand, when the setting mode that is Mode B2 is selected by the user, the setter 216 sets the cooling completion condition indicating the predetermined temperature that is 45° C. In this case, the fuser 7 is not allowed to be detachable until the temperature measured by the temperature sensor 1001 has decreased to 45° C. or lower after the start of the cooling mode. That is, the fuser 7 is not allowed to be detachable until the temperature of the fuser 7 has decreased to 45° C. or lower after the start of the cooling mode. Thus, when the setting mode that is Mode B2 is selected by the operation of the user, the fuser 7 is allowed to be detachable earlier than when the setting mode that is Mode B1 is selected.

Moreover, for example, when the setting mode that is Mode B1 is selected, in step S1209, the notifier 218 causes the display 202 to display the completion notification screen 801 illustrated in FIG. 8A. Moreover, for example, when the setting mode that is Mode B2 is selected, the notifier 218 causes the display 202 to display the completion notification screen 802 illustrated in FIG. 8B. Message X1 included in the completion notification screen 801 is different from Message X2 included in the completion notification screen 802 is that Message X2 includes a message "Please be careful because fusing unit has heat and is very dangerous." That is, when Mode B2 is selected, the notifier 218 causes the display 202 to display a message for calling the user's attention. Accordingly, the notifier 218 can cause the user to recognize that the fuser 7 is not sufficiently cooled.

As described above, the image forming apparatus 100 according to the present embodiment can cool the fuser 7 until the temperature of the fuser 7 reaches a temperature or lower desired by the user in accordance with the skill of the user, a work schedule, or the like. As a result, the image forming apparatus 100 according to the present embodiment can cause the user to safely perform the work of replacing the fuser 7 after the fuser 7 is cooled until the temperature of the fuser 7 reaches the temperature or lower desired by the user.

Third Embodiment

A third embodiment will be described with reference to FIG. 13. In the drawing, the same or similar elements are denoted by the same reference numerals, and the redundant description will be omitted. Configurations and processing having substantially the same functions as those in other embodiments are denoted by the common reference numerals, the descriptions thereof are omitted, and differences from the other embodiments will be described.

Figure 13:
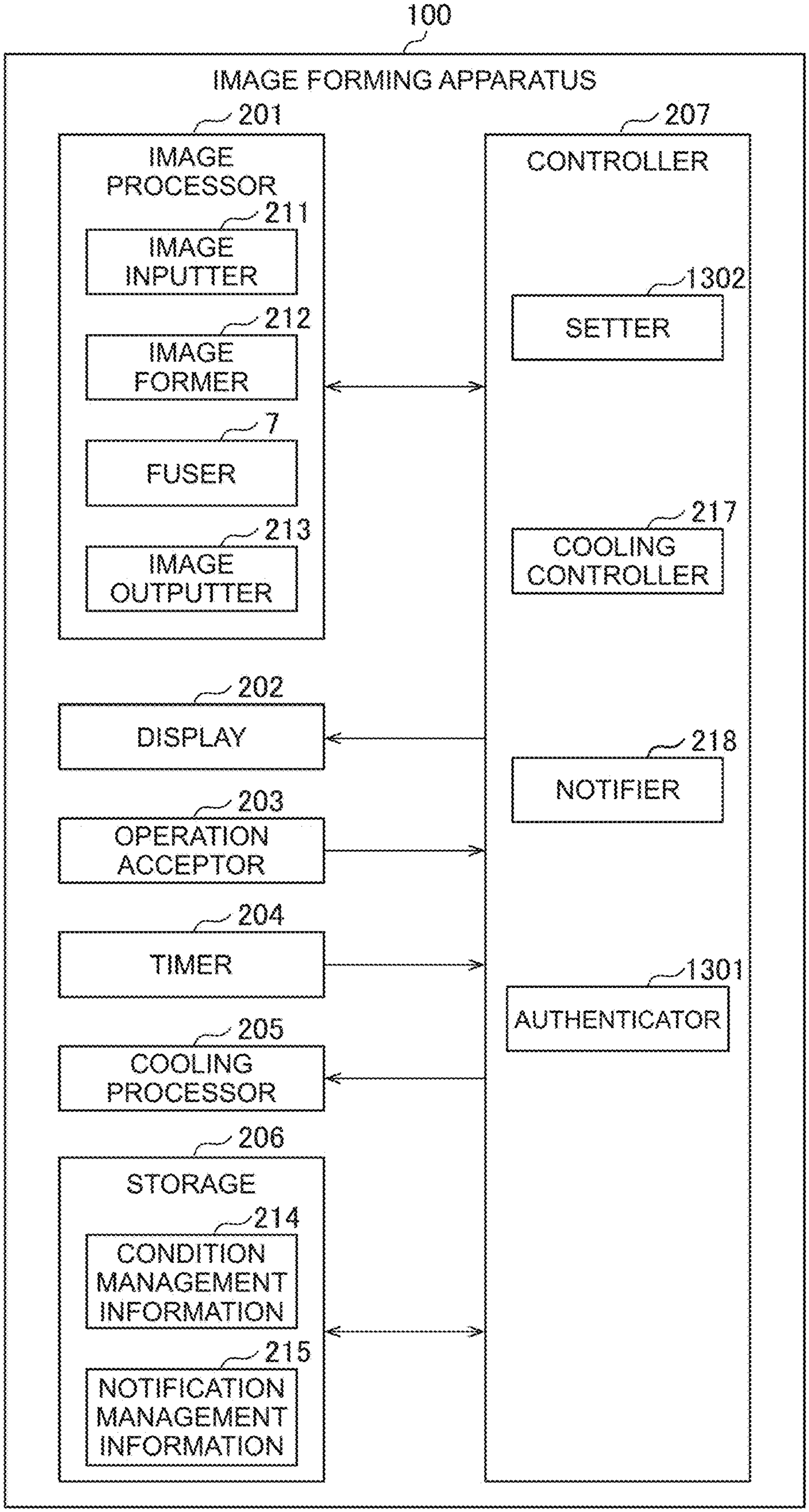
FIG. 13 is a block diagram illustrating an example of a functional configuration of an image forming apparatus according to a third embodiment.

FIG. 13 is a block diagram illustrating an example of the functional configuration of the image forming apparatus 100 according to the present embodiment. The image forming apparatus 100 illustrated in FIG. 13 is different from the image forming apparatus 100 illustrated in FIG. 2 in that the image forming apparatus 100 illustrated in FIG. 13 includes an authenticator 1301 and a setter 1302.

The authenticator 1301 authenticates a user.

The setter 1302 can set a setting mode selected by the user authenticated by the authenticator 1301. That is, a cooling completion condition to be set is selected by the user authenticated by the authenticator 1301.

Alternatively, when an administrator authority is given to the user, the setter 1302 may allow the cooling completion condition to be selected by an operation of the user to whom the administrator authority is given. That is, the cooling completion condition to be set may be selected by the user to whom the administrator authority is given.

If all users can select the setting mode, a time for cooling the fuser 7 may be capable of being set so that the fuser 7 is allowed to be detachable before the fuser 7 is sufficiently cooled. However, the image forming apparatus 100 according to the present embodiment can cool the fuser 7 for a time corresponding to the experience and skill of a worker who replaces the fuser 7 by limiting the user who can perform the operation of selecting the cooling completion condition.

Modified Example

As a modified example of the image forming apparatus 100 according to the present embodiment, a settable setting mode may be determined in accordance with a change authority given to the user.

Figure 14:
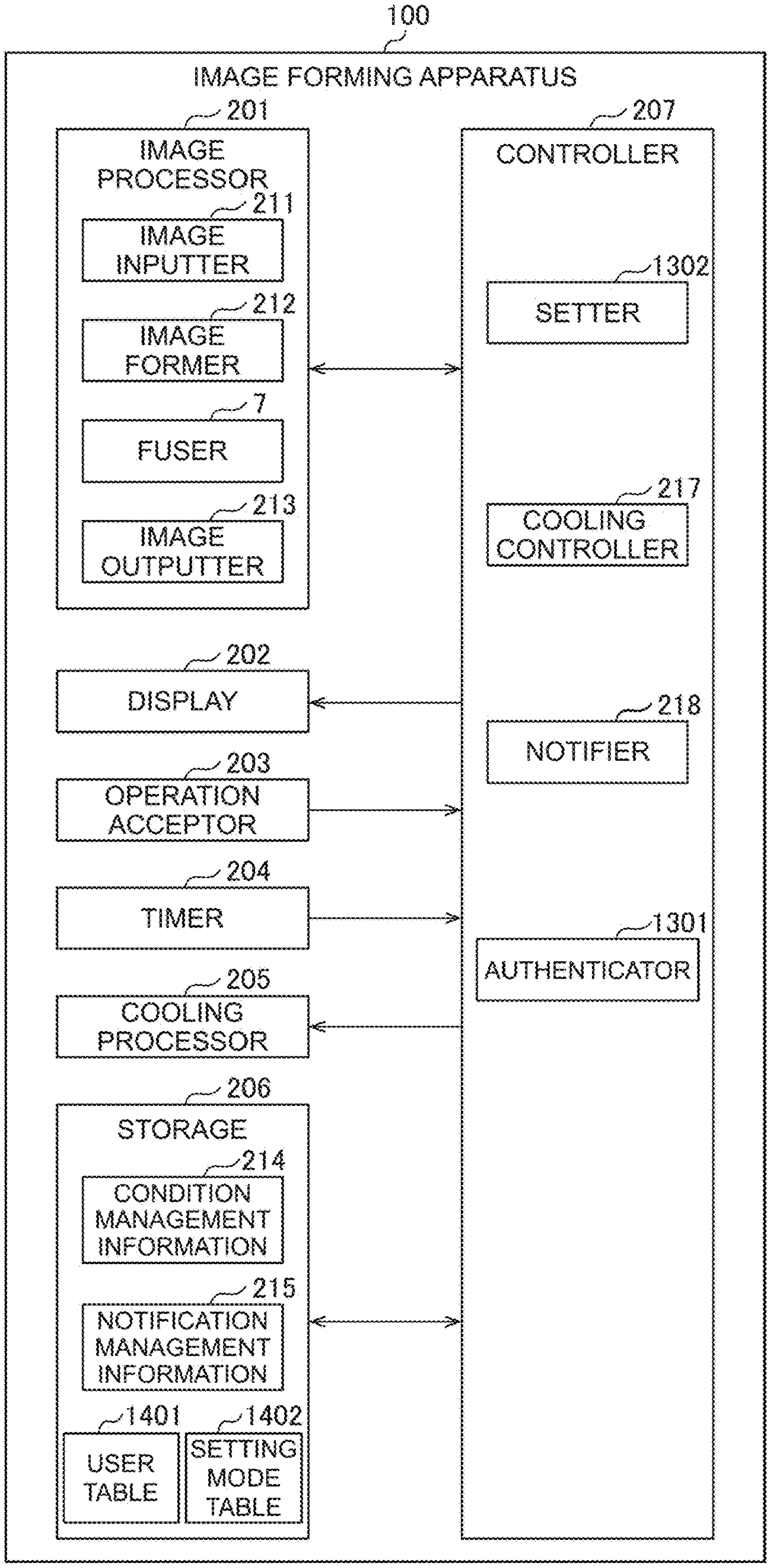
FIG. 14 is a block diagram illustrating an example of a functional configuration of an image forming apparatus according to a modified example of the third embodiment.

FIG. 14 is a block diagram illustrating an example of the functional configuration of the image forming apparatus 100 according to the present modified example. The image forming apparatus 100 illustrated in FIG. 14 is different from the image forming apparatus 100 illustrated in FIG. 13 in that a user table 1401 (refer to FIG. 15) and a setting mode table 1402 (refer to FIG. 16) are stored in the storage 206 of the image forming apparatus 100 illustrated in FIG. 14.

The setter 1302 according to the present modified example can set a setting mode in association with the change authority given to the user in the setting mode table 1402.

FIG. 15 is a diagram illustrating an example of the user table 1401. In the user table 1401, the user is registered in association with the change authority. For example, in the user table 1401, the user who is User_A is associated with the change authority as an administrator. Moreover, for example, in the user table 1401, the user who is User_B is associated with the change authority as a skilled worker. Moreover, for example, in the user table 1401, each of the users who are User_C, User_D, and User_E is associated with the change authority as an ordinary person.

FIG. 16 is a diagram illustrating an example of the setting mode table 1402. In the setting mode table 1402, the change authority is registered in association with the settable setting mode. In the setting mode table 1402 illustrated in FIG. 16, the change authority of each of the administrator, the skilled worker, and the ordinary person illustrated in FIG. 15 is registered in association with at least one setting mode among the setting modes that are Mode A1, Mode A2, and Mode A3 illustrated in FIG. 3.

For example, in the setting mode table 1402, the change authority as the administrator is registered in association with Mode A1, Mode A2, and Mode A3. Thus, the setter 1302 can set one setting mode among the setting modes that are Mode A1, Mode A2, and Mode A3 by the operation of User_A to whom the change authority as the administrator is given.

For example, in the setting mode table 1402, the change authority as the skilled worker is registered in association with Mode A1 and Mode A2. Thus, the setter 1302 can set a setting mode that is Mode A1 or Mode A2 by the operation of User_B to whom the change authority as the skilled worker is given.

For example, in the setting mode table 1402, the change authority as the ordinary person is registered in association with Mode A1. Thus, for example, the setter 1302 can set a setting mode that is Mode A1 by the operation of User_C to whom the change authority as the ordinary person is given.

As described above, the image forming apparatus 100 according to the present modified example limits a setting mode that can be set by each user. Accordingly, the image forming apparatus 100 according to the present modified example can cool the fuser 7 for a time corresponding to the experience and skill of the user and corresponding to the setting mode selected by the user.

Fourth Embodiment

A fourth embodiment will be described with reference to FIG. 17. In the drawing, the same or similar elements are denoted by the same reference numerals, and the redundant description will be omitted. Configurations and processing having substantially the same functions as those in other embodiments are denoted by the common reference numerals, the descriptions thereof are omitted, and differences from the other embodiments will be described.

Figure 17:
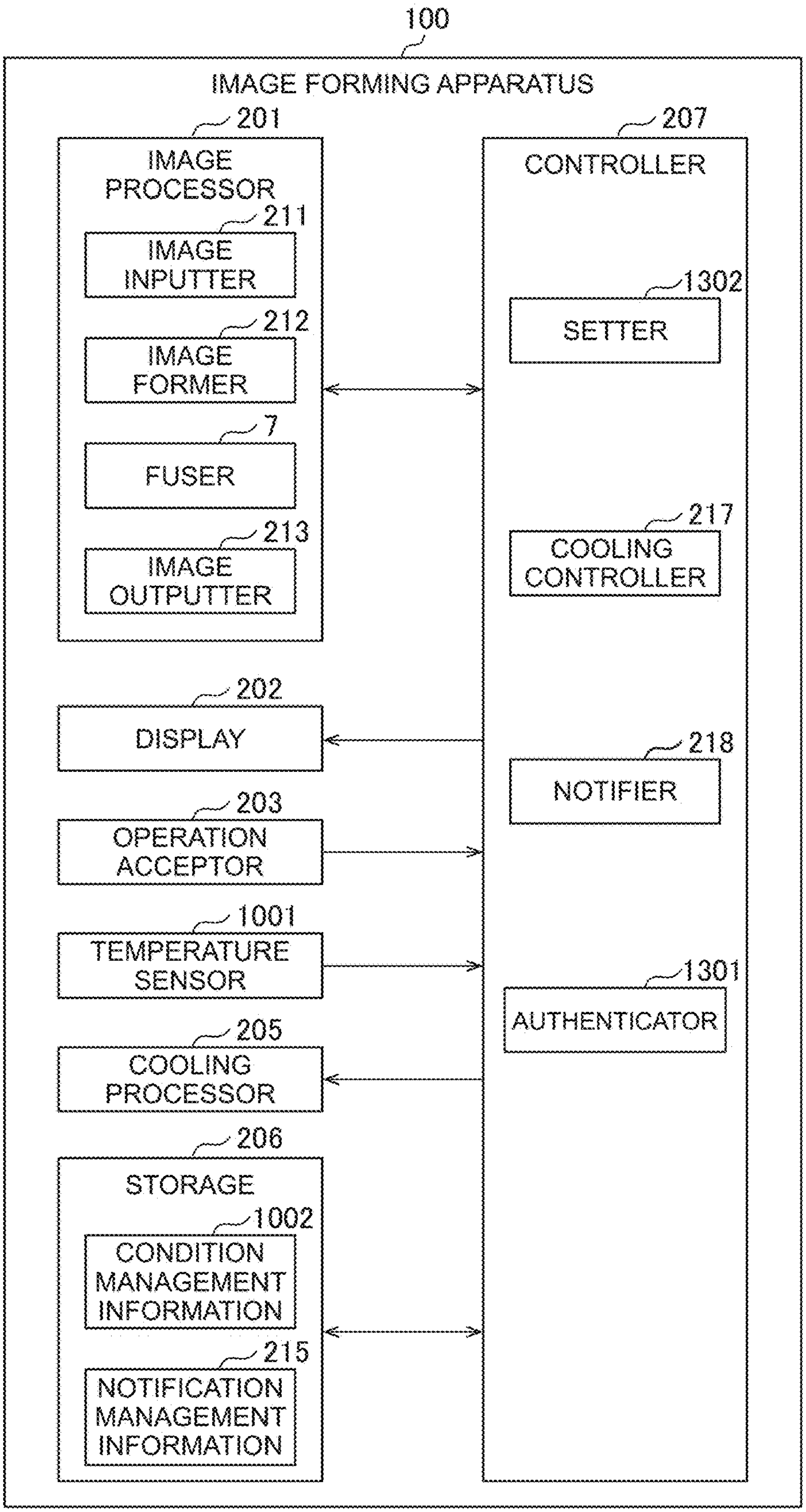
FIG. 17 is a block diagram illustrating an example of a functional configuration of an image forming apparatus according to a fourth embodiment.

FIG. 17 is a block diagram illustrating an example of the functional configuration of the image forming apparatus 100 according to the present embodiment. The image forming apparatus 100 illustrated in FIG. 17 is different from the image forming apparatus 100 illustrated in FIG. 10 in that the image forming apparatus 100 illustrated in FIG. 17 includes the authenticator 1301 and the setter 1302.

Similarly to the image forming apparatus 100 according to the third embodiment, if all users can select the setting mode, a predetermined temperature may be capable of being set so that the fuser 7 is allowed to be detachable before the fuser 7 is sufficiently cooled. However, the image forming apparatus 100 according to the present embodiment can cool the fuser 7 until the temperature of the fuser 7 reaches a temperature or lower corresponding to the experience and skill of a worker who replaces the fuser 7 by limiting the user who can perform the operation of selecting the cooling completion condition.

Modified Example

Similarly to the modified example of the image forming apparatus 100 according to the third embodiment, as a modified example of the image forming apparatus 100 according to the present embodiment, a settable setting mode may be determined in accordance with a change authority given to the user.

Figure 18:
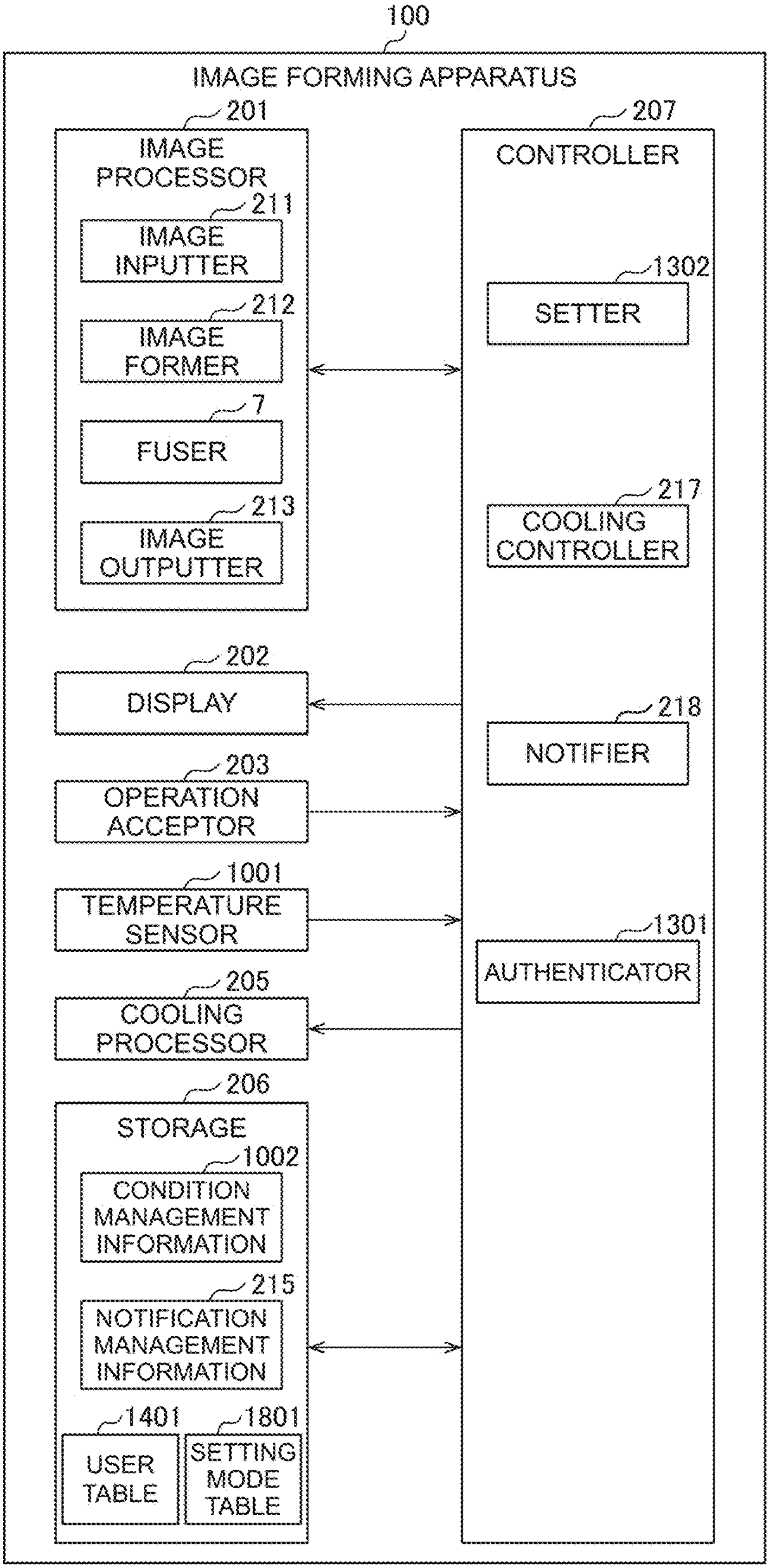
FIG. 18 is a block diagram illustrating an example of a functional configuration of an image forming apparatus according to a modified example of the fourth embodiment.

FIG. 18 is a block diagram illustrating an example of the functional configuration of the image forming apparatus 100 according to the present modified example. The image forming apparatus 100 illustrated in FIG. 18 is different from the image forming apparatus 100 illustrated in FIG. 17 in that the user table 1401 and a setting mode table 1801 (refer to FIG. 19) are stored in the storage 206 of the image forming apparatus 100 illustrated in FIG. 18.

The setter 1302 according to the present modified example can set a setting mode in association with the change authority given to the user in the setting mode table 1801.

FIG. 19 is a diagram illustrating an example of the setting mode table 1801. The setting mode table 1801 illustrated in FIG. 19 is different from the setting mode table 1402 illustrated in FIG. 16 in that, in the setting mode table 1801 illustrated in FIG. 19, the change authority is registered in association with at least one setting mode among the setting modes that are Mode B1, Mode B2, and Mode B3 illustrated in FIG. 11.

As described above, the image forming apparatus 100 according to the present modified example can cool the fuser 7 until the temperature of the fuser 7 reaches a temperature or lower corresponding to the experience and skill of the user and corresponding to the setting mode selected by the user.

Fifth Embodiment

A fifth embodiment will be described. In the drawing, the same or similar elements are denoted by the same reference numerals, and the redundant description will be omitted. Configurations and processing having substantially the same functions as those in other embodiments are denoted by the common reference numerals, the descriptions thereof are omitted, and differences from the other embodiments will be described.

The configuration of the image forming apparatus 100 according to the present embodiment is as illustrated in FIG. 13.

The storage 206 according to the present embodiment stores the number of times of executing the cooling mode in association with each user. That is, the storage 206 stores the number of times of performing the work of replacing the fuser 7 in association with each user.

The setter 1302 according to the present embodiment can set a cooling completion condition selected by a user in association with the number of times equal to or higher than a threshold value. That is, the cooling completion condition to be set is selected by the user in association with the number of times equal to or higher than the threshold value. Thus, in the image forming apparatus 100 according to the present embodiment, the user with the number of times of performing the work of replacing the fuser 7 lower than the threshold value cannot perform the operation of selecting the setting mode. On the other hand, in the image forming apparatus 100 according to the present embodiment, the user with the number of times of performing the work of replacing the fuser 7 equal to or higher than the threshold value can perform the operation of selecting the setting mode. Accordingly, the image forming apparatus 100 according to the present embodiment does not allow an inexperienced worker to change the time for cooling the fuser 7, and allows a skilled worker to change the time for cooling the fuser 7.

Modified Example

As a modified example of the image forming apparatus 100 according to the present embodiment, the image forming apparatus 100 may include the condition management information 1002 and the temperature sensor 1001 instead of the timer 204 and the condition management information 214. The setter 1302 can set the cooling completion condition selected by the user in association with the number of times equal to or higher than the threshold value, so that the image forming apparatus 100 according to the present modified example does not allow an inexperienced worker to change the temperature to be reached by cooling the fuser 7, and allows a skilled worker to change the temperature to be reached by cooling the fuser 7.

Each processing executed in the above embodiments is not limited to the processing mode exemplified in each embodiment. The above-described functional blocks may be implemented by using either a logic circuit (hardware) formed in an integrated circuit or the like or software using a CPU. Each processing executed in the above embodiments may be executed by a plurality of computers. For example, a part of the processing executed by the controller 207 of the image forming apparatus 100 may be executed by another computer, or all of the processing may be shared and executed by a plurality of computers.

The present disclosure is not limited to the above-described embodiments, and may be replaced with a configuration which is substantially the same as the configuration illustrated in the above-described embodiments, a configuration which exhibits the same operation and effect, or a configuration which can achieve the same object. In the present disclosure, an embodiment obtained by appropriately combining the technical measures respectively disclosed in different embodiments is also included in the technical scope of the present disclosure. Furthermore, a new technical feature can be formed by combining the technical measures respectively disclosed in each embodiment.

What is claimed is:

1. An image forming apparatus comprising:
- a detachable fuser;
- an operation acceptor that accepts a selection of a cooling completion condition among a plurality of cooling completion conditions, each of the plurality of cooling completion conditions having different completion conditions; and
- a cooling controller that starts a cooling mode for cooling the detachable fuser, and stops the cooling mode when the cooling completion condition accepted by the operation acceptor is satisfied.

2. The image forming apparatus according to claim 1, wherein
- the cooling controller, after a start of the cooling mode, does not allow the detachable fuser to be detachable until the cooling mode is stopped, and allows the detachable fuser to be detachable after the cooling mode is stopped.

3. The image forming apparatus according to claim 1, wherein
- the cooling completion condition indicates a predetermined time, and
- the cooling controller stops the cooling mode after the predetermined time has elapsed after a start of the cooling mode.

4. The image forming apparatus according to claim 3, further comprising:
- a notifier that outputs a cooling completion notification indicating a message corresponding to the predetermined time when the cooling controller stops the cooling mode.

5. The image forming apparatus according to claim 1, further comprising:
- a temperature sensor that measures a temperature of a region along the detachable fuser, wherein
- the cooling completion condition indicates a predetermined temperature, and
- the cooling controller stops the cooling mode after the temperature has reached the predetermined temperature or lower after a start of the cooling mode.

6. The image forming apparatus according to claim 5, further comprising:
- a notifier that outputs a cooling completion notification indicating a message corresponding to the predetermined temperature when the cooling controller stops the cooling mode.

7. The image forming apparatus according to claim 1, wherein the cooling completion condition is selected by a user to whom an administrator authority is given.

8. The image forming apparatus according to claim 1, further comprising:

an authenticator that authenticates a user, wherein the cooling completion condition is selected by a user authenticated by the authenticator.

9. The image forming apparatus according to claim 1, further comprising:

a storage that stores a number of times of executing the cooling mode in association with each user, wherein the cooling completion condition is selected by a user in association with the number of times that is equal to or higher than a threshold value.

* * * * *